United States Patent
Zheng et al.

(10) Patent No.: US 11,318,847 B2
(45) Date of Patent: May 3, 2022

(54) ENERGY MANAGEMENT CONTROL SYSTEM SUITABLE FOR SOLAR-POWERED UNMANNED AERIAL VEHICLE AND CONTROL METHOD THEREOF

(71) Applicant: Zhejiang University, Hangzhou (CN)

(72) Inventors: Yao Zheng, Hangzhou (CN); Junyin Chen, Hangzhou (CN); Changping Du, Hangzhou (CN); Guanghua Song, Hangzhou (CN); Rui Yang, Hangzhou (CN); Zhixian Ye, Hangzhou (CN); Zekun Zhang, Hangzhou (CN)

(*) Notice: Subject to any disclaimer, the term of this patent is extended or adjusted under 35 U.S.C. 154(b) by 0 days.

(21) Appl. No.: 17/347,226

(22) Filed: Jun. 14, 2021

(65) Prior Publication Data
US 2022/0032780 A1    Feb. 3, 2022

(30) Foreign Application Priority Data
Jul. 28, 2020    (CN) .......................... 202010737563.4

(51) Int. Cl.
*B60L 8/00* (2006.01)
*B60L 58/18* (2019.01)
(Continued)

(52) U.S. Cl.
CPC .............. *B60L 8/003* (2013.01); *B60L 58/18* (2019.02); *B64C 39/024* (2013.01); *H02J 7/35* (2013.01);
(Continued)

(58) Field of Classification Search
CPC ...... B60L 8/003; B60L 58/18; B60L 2260/24; B60L 2200/10; B60L 2210/10;
(Continued)

(56) References Cited

U.S. PATENT DOCUMENTS

| 8,448,898 B1* | 5/2013 | Frolov .................. B64D 27/24 244/59 |
| 2016/0009402 A1* | 1/2016 | Hunter .................. B64C 39/02 244/53 R |

(Continued)

FOREIGN PATENT DOCUMENTS

| CN | 109194112 | 1/2019 |
| CN | 209088813 | 7/2019 |

OTHER PUBLICATIONS

Chinese Office Action dated Sep. 11, 2020 issued in priority Chinese Application No. 202010737563.4, with English translation.
(Continued)

*Primary Examiner* — Hunter B Lonsberry
*Assistant Examiner* — Daniel L Greene

(57) ABSTRACT

The present disclosure discloses an energy management system suitable for a solar-powered unmanned aerial vehicle and a control method thereof, which are used for an aerospace vehicle energy system. The system comprises a photovoltaic module, an MPPT controller, a first DC-DC circuit, a battery pack, a first anti-reverse circuit, a second DC-DC circuit, a second anti-reverse circuit, an ESC, a BLDC, an on-board controller, a communication link and a voltage stabilizing module. During cruising, the battery pack directly supplies power to the ESC through the first anti-reverse circuit; when high-power power output is needed, the battery pack supplies power to the ESC through the second DC-DC circuit and the second anti-reverse circuit in sequence, wherein the output voltage of the second DC-DC circuit and the accelerator signal input of the ESC are controlled by the on-board controller.

18 Claims, 3 Drawing Sheets

(51) Int. Cl.
*H02J 7/35* (2006.01)
*B64C 39/02* (2006.01)

(52) U.S. Cl.
CPC ....... *B60L 2200/10* (2013.01); *B60L 2210/10* (2013.01); *B60L 2240/547* (2013.01); *B60L 2260/24* (2013.01); *B64C 2201/042* (2013.01)

(58) Field of Classification Search
CPC ............ B60L 2240/547; B64C 39/024; B64C 2201/042; H02J 7/35
See application file for complete search history.

(56) References Cited

U.S. PATENT DOCUMENTS

| | | |
|---|---|---|
| 2016/0236790 A1* | 8/2016 | Knapp .................. G08G 5/0052 |
| 2017/0158320 A1* | 6/2017 | Bosch ..................... B64C 27/52 |
| 2018/0208321 A1* | 7/2018 | Armstrong .......... H01M 10/425 |
| 2018/0273170 A1* | 9/2018 | D'Sa ...................... B64C 39/024 |
| 2020/0148373 A1* | 5/2020 | Long ....................... F01D 15/10 |
| 2020/0274203 A1* | 8/2020 | Kirleis .................. H02J 7/0016 |
| 2020/0274368 A1* | 8/2020 | Crouse, Jr. ................ H02J 4/00 |
| 2020/0331602 A1* | 10/2020 | Mikic ..................... B64C 11/18 |
| 2021/0123741 A1* | 4/2021 | Candido ................ G01C 21/20 |

OTHER PUBLICATIONS

Chinese Office Action dated Oct. 12, 2020 issued in priority Chinese Application No. 202010737563.4, with English translation.

* cited by examiner

ENERGY MANAGEMENT CONTROL SYSTEM SUITABLE FOR SOLAR-POWERED UNMANNED AERIAL VEHICLE AND CONTROL METHOD THEREOF

CROSS REFERENCE TO RELATED APPLICATION(S)

This patent application claims the benefit and priority of Chinese Patent Application No. 202010737563.4, filed on Jul. 28, 2020, the disclosure of which is incorporated by reference herein in its entirety as part of the present application.

TECHNICAL FIELD

The present disclosure belongs to the technical field of an aerospace vehicle energy system, and particularly relates to an energy management control system suitable for a solar-powered unmanned aerial vehicle and a control method thereof.

BACKGROUND ART

A solar-powered unmanned aerial vehicle has the advantages of long operating time, wide coverage, low operating cost and no environmental pollution, and has broad application prospects. Generally, for a solar-powered unmanned aerial vehicle with 24-hour uninterrupted flight capability, its optimal design point is its cruising operating point. In its typical flight mission profile, it is in the cruising state most of the time, while the take-off, climbing and maneuvering flight involving high power output only account for a small part. therefore, the efficiency of the energy management system and power the system of a solar-powered unmanned aerial vehicle at this operating point directly affects its most critical endurance performance. In the design process, the traditional energy management system and the power system of a solar-powered unmanned aerial vehicle will also focus on improving the efficiency of the design point. However, because the power output needs to take into account the operating state of high-power output, it is necessary to use higher voltage of a battery pack and operating voltage of a power unit under the traditional idea of changing accelerator amount with constant voltage. Due to the electrical characteristics of the system itself, such power system can meet the high-power output demand in a short time under high operating voltage. However, at the design point (the cruise operating point), because the operating power at this time is less than ¼ of the rated power, it deviates from the high-efficiency range of the power system. However, if the power system is matched according to the cruise operating point as the design point, the maximum output power of the power system often cannot meet the requirements of take-off, climbing or maneuvering flight. This is a contradiction that is difficult to solve under the traditional control scheme.

SUMMARY

The purpose of the present disclosure is to provide an energy management control system suitable for a solar-powered unmanned aerial vehicle and a control method thereof aiming at the shortcomings of the prior art. The power management scheme of single battery pack and double outputs is used, which can realize the power output in a certain voltage range. The input voltage of the Electronic Speed Controller (ESC) and the accelerator input amount of the ESC are jointly adjusted and controlled through corresponding control strategies, so as to improve the overall efficiency of the power system, thereby improving the endurance time of an unmanned aerial vehicle.

The present disclosure is realized by the following technical scheme:

An energy management system suitable for a solar-powered unmanned aerial vehicle, comprising: a photovoltaic module, a Maximum Power Point Tracking (MPPT) controller, a first direct current to direct current (DC-DC) circuit, a battery pack, a first anti-reverse circuit, an ESC, a brushless direct current(BLDC) motor, a second DC-DC circuit, a second anti-reverse circuit, an onboard controller and a communication link; wherein the MPPT controller is powered by the photovoltaic module and is used to adjust the output voltage and current of the photovoltaic module to achieve the maximum power output; the output end of the MPPT controller is connected with the input end of the first DC-DC circuit, and the output end of the first DC-DC circuit is connected with the battery pack for controlling charging the battery pack; the battery pack supplies power to the ESC via the first anti-reverse circuit, and the ESC drives the BLDC to rotate; at the same time, the battery pack is also connected with the input end of the second DC-DC circuit, and then is connected in parallel to the power supply end of the ESC via the second anti-reverse circuit; the second DC-DC circuit uses an adjustable DC-DC circuit which changes the output voltage value according to the input signal; and in the initial state of the system, the second DC-DC circuit does not operate and does not supply power to the ESC; the communication link is used to transmit the original accelerator information output by the flight control system to the on-board controller; the on-board controller receives the input and output voltage and current information from the MPPT controller and the output voltage and current information of the first DC-DC circuit for monitoring circuit state; corresponds the original accelerator information transmitted by the communication link to the power demand of the power system, and outputs two control signals at the same time according to the relationship between the current power demand of the power system and the set cruise power threshold, wherein the first control signal is used to control the accelerator amount of the ESC, and the second control signal is used to control the on-off of the second DC-DC circuit and its output voltage value during operation.

In the above technical scheme, further, the system further comprises a voltage stabilizing module, which is used to provide a stable power supply to an on-board device.

Further, the first DC-DC circuit may be a BUCK-type circuit, a synchronous BUCK-type circuit or a BUCK-BOOST-type circuit.

Further, the second DC-DC circuit preferably uses a boost DC-DC circuit.

An energy management control method suitable for a solar-powered unmanned aerial vehicle, which is realized by the system described above, wherein the control method comprises the steps of:

1) the on-board controller receiving the original accelerator signal output by the flight control system through a communication link, and mapping the original accelerator signal with the power demand of the power system so as to obtain the power demand of the power system at this time;

2) determining the power demand of the power system:
when the power demand of the power system is less than or equal to the preset cruise power threshold, the onboard control system outputs the control signal of the ESC to change the actual accelerator value, while the second DC-DC circuit does not operate and does not supply power to the ESC;

when the power demand of the power system is higher than the preset cruise power threshold, the on-board control system changes the accelerator amount of the ESC and the output voltage value of the second DC-DC circuit at the same time according to the joint adjustment strategy, so as to realize high-power power output.

In the above control method, the cruise power threshold is set according to the target power value of the unmanned aerial vehicle in the cruising state, and the value is greater than the target power value.

Further, the joint adjustment strategy is to query a pre-obtained power matching table, so as to output the accelerator amount of the ESC and the output voltage value of the second DC-DC corresponding to the required power, and the power matching table records the operating voltage and the accelerator amount of the ESC corresponding to the optimal efficiency of the system under different power demands. Still further, the power matching table is obtained by a wind tunnel test, first, the efficiency curve of the power device under the target operating condition with equal power output is obtained, and then the operating voltage corresponding to the highest efficiency point on the curve and the corresponding accelerator amount are recorded one by one; different equal power outputs correspond to corresponding efficiency curves, respectively, and the operating voltage, accelerator amount and power corresponding to the highest point in each efficiency curve are recorded to obtain the power matching table.

Alternatively, the joint adjustment strategy may also be realized by installing corresponding force sensors on the power unit and combining with a dynamic tracking algorithm aiming at tracking the real-time highest efficiency of the power system. Refer to CN 108791819A for the method.

Further, the original accelerator signal is mapped with the power demand of the power system, and linear mapping may be used. The original accelerator signal can be uniquely mapped to the power interval.

Compared with the prior art, the present disclosure has the following beneficial effects.

Different from the traditional scheme of changing accelerator amount with constant voltage, it is necessary to use higher battery pack voltage to ensure maximum power output. In the scheme design of the present disclosure, because a specific battery pack power supply scheme is used, it can match the design point (the cruising operating point) of the solar-powered unmanned aerial vehicle, improve the power system efficiency of the solar-powered unmanned aerial vehicle during cruising stage, and further improve the flight performance of the aircraft. When the system judges that it needs high power demand, the onboard controller controls the second DC-DC circuit to output a voltage higher than the battery pack to supply power to the ESC. Combined with the control of the accelerator amount of the ESC, the power system can still maintain high system efficiency at high power output.

It is worth noting that, compared with the scheme of directly adding an adjustable DC-DC circuit behind the battery pack and simultaneously controlling its output voltage and the accelerator amount of the ESC, although the scheme of the present disclosure can also improve efficiency of the power system in a large operating area (including the state from low-power cruising to high-power maneuvering, etc.), in the design process of the scheme of the present disclosure, taking into account that the solar-powered unmanned aerial vehicle has a special operating point of cruising state, the scheme design of directly supplying power to the power unit by the battery pack is used. According to the scheme of the present disclosure, the system efficiency can be further improved on the basis of the above scheme. Specifically, the conversion efficiency of the adjustable variable voltage DC-DC circuit is 92%-96% during operation. In the above scheme, regardless of whether the solar-powered unmanned aerial vehicle is in low-power cruise or high-power maneuver state, the system power can pass through the adjustable DC-DC circuit to the ESC, and there will be 4%-8% of power loss. In such a manner that the battery pack directly supplies power to the power unit, in the low-power cruise stage, the system power will not pass through the adjustable DC-DC circuit to the ESC, so as to avoid the electric energy loss on the adjustable DC-DC circuit. The cruising state of the solar-powered unmanned aerial vehicle occupies most of the total flight mission time. therefore, the design of the present disclosure can significantly improve the efficiency of the power system of the solar-powered unmanned aerial vehicle, thereby improving the flight performance of the aircraft.

DESCRIPTION OF REFERENCE SIGNS IN THE FIGURES

1—photovoltaic module; 2—MPPT controller; 3—first DC-DC circuit; 4—battery pack;
5—first anti-reverse circuit; 6—second DC-DC circuit; 7—second anti-reverse circuit; 8—ESC (electronic speed controller);
9—BLDC (brushless DC motor); 10—on-board controller; 11—communication link; 12—voltage stabilizing module.

DETAILED DESCRIPTION OF THE EMBODIMENTS

The present disclosure will be further explained with reference to the drawings and specific embodiments.

Figure 1:
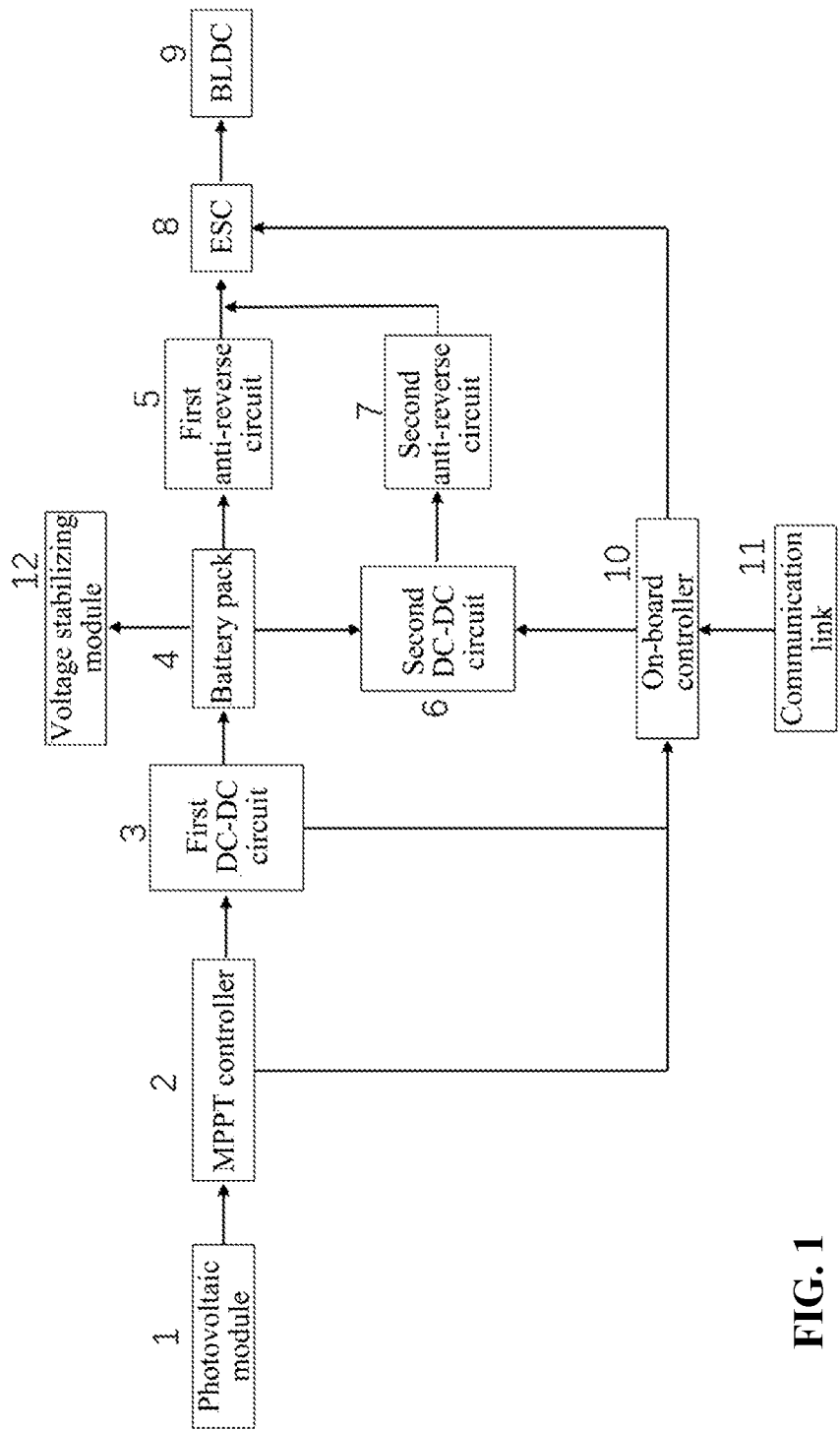
FIG. 1 is a schematic structural diagram of an energy management system suitable for a solar-powered unmanned aerial vehicle according to the present disclosure.

As shown in FIG. 1, this example mainly provides an energy management system suitable for a solar-powered unmanned aerial vehicle, comprising a photovoltaic module, an MPPT controller, a first DC-DC circuit, a battery pack, a first anti-reverse circuit, a second DC-DC circuit, a second anti-reverse circuit, an ESC, a BLDC, an on-board controller, a communication link and a voltage stabilizing module; wherein the MPPT controller is powered by the photovoltaic module and is used to adjust the output voltage and current of the photovoltaic module to achieve the maximum power output; the output end of the MPPT controller is connected with the input end of the first DC-DC circuit, and the output end of the first DC-DC circuit is connected with the battery pack for controlling charging the battery pack.

In a specific embodiment, the MPPT controller can use the LT8490 chip as the core chip, which uses a disturbance observation method to realize the maximum power output of the photovoltaic module. Meanwhile, the LT8490 has the battery management function. Cooperating with the first DC-DC circuit, the charging control uses multi-stage charging management, namely trickle charging, constant current charging and constant voltage charging, and the trickle charging current can be adjusted. The specific charging stages are as follows:

Stage 0: trickle charging, charging at 20-30% of the set maximum charging current until the battery voltage is higher than 70% of the set charging voltage;

Stage 1: constant current charging, charging at the set maximum charging current until the battery voltage is higher than 98% of the set charging voltage;

Stage 2: constant voltage, charging at the set charging voltage until the charging current is lower than C/10, where C is the charging and discharging rate of the battery pack, such as a set of batteries with a capacity of 30 Ah, and the C/10 charging current represents the charging current of 3 A.

In a specific embodiment, the maximum power output voltage of the photovoltaic module is about 28V, which fluctuates up and down with the change of surface temperature and illumination intensity of the photovoltaic cell. The output voltage of the MPPT is 12.6V, and the maximum charging current is 30 A. Correspondingly, the used battery pack has a full charge voltage of 12.6V and a battery capacity of 30 Ah.

The battery pack supplies power to the ESC via a first anti-reverse circuit, and the ESC drives the BLDC to rotate. In addition, the battery pack is also connected with a second DC-DC circuit, and then is connected in parallel to the power supply end of the ESC via a second anti-reverse circuit. The second DC-DC circuit does not operate and does not supply power to the ESC in an initial state. The first DC-DC circuit can use a BUCK-type circuit, a synchronous BUCK-type circuit or a BUCK-BOOST-type circuit, such as a BUCK-type circuit, a synchronous BUCK-type circuit or a BUCK-BOOST-type circuit, such as an LM2577 boost digital display module, a DSN6000AUD automatic boost and buck module, an LM317 buck circuit board and an AP-D5830A adjustable buck module. The second DC-DC circuit is an adjustable DC-DC circuit, which can change the output voltage value according to the input signal, and uses a boost DC-DC circuit, such as an LM2577 adjustable boost circuit board. The first anti-reverse circuit and the second anti-reverse circuit can use the same structure, which is mainly used for anti-reverse connection. A conventional anti-reverse circuit can be used, such as a Max low-dropout ideal diode with a maximum operating current of 15 A. When being turned on, the MOSFET has the voltage drop of only 20 mV at both ends. The ideal diode of Jiadi 100V 50 A can also be used, which has a static operating current of 0.6-1.5 mA, a design of dual MOS, and an internal resistance of only 0.75 milliohm. Alternatively, at least one MOS tube and a diode controller are used, wherein at least one diode is provided in the MOS tube, the S pole of the MOS tube is provided at the input end of the anti-reverse circuit, and the D pole of the MOS tube is provided at the output end of the anti-reverse circuit. The input end of the diode controller is connected with the S pole of the MOS tube, the output end of the diode controller is connected with the D pole of the MOS tube, and the driving end of the diode controller is connected with the G pole of the MOS tube.

The communication link transmits the original accelerator value output by the flight control system to the on-board controller.

The on-board controller receives the input and output voltage and current information from the MPPT controller and the output voltage and current information of the first DC-DC circuit for monitoring circuit state; corresponds the original accelerator information transmitted by the communication link to the power demand of the power system, and outputs two control signals at the same time according to the relationship between the current power demand of the power system and the set cruise power threshold, wherein the first control signal is used to control the accelerator amount of the ESC, and the second control signal is used to control the on-off of the second DC-DC circuit and its output voltage value during operation. The preset cruise power threshold can usually be set according to the target power value of an unmanned aerial vehicle in the cruising state. It will be sufficient if the value is larger than the target power value. In a specific embodiment, the cruise power threshold can be set to be 120% of the target power value of an unmanned aerial vehicle in the cruising state.

The voltage stabilizing module is used to provide a stable power supply to the on-board device. An integrated circuit can be used to convert the output voltage of the battery pack into 12V voltage and 5V voltage through the LT8632 chip, and is provided with protection circuits such as a filter circuit and an isolation circuit, so that each output voltage is linearly stable.

Figure 2:
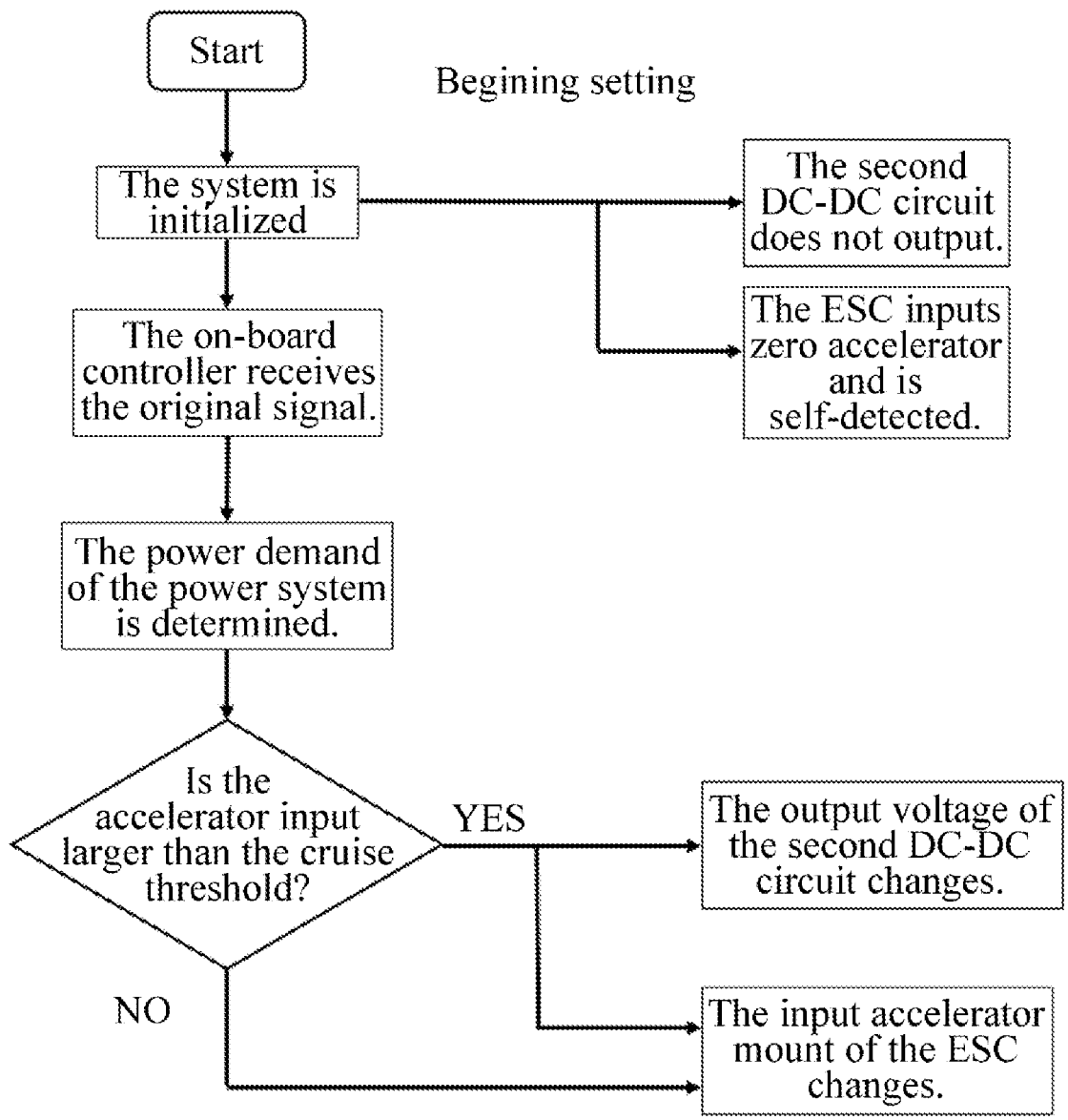
FIG. 2 is an operating flow chart of an energy management system suitable for a solar-powered unmanned aerial vehicle according to the present disclosure.

FIG. 2 shows the operating flow chart realized by the system using this example, describing the main flow of the power control method of the energy management system for a solar-powered unmanned aerial vehicle.

1) The controller receives the original accelerator signal output by the flight control system through the communication link and corresponds the original accelerator signal to the power demand of the power system. Here, linear mapping can be directly used, and the original accelerator signal is uniquely mapped to the power interval. For example, in a specific embodiment, under the incoming flow condition of 10 m/s, 0-100% of the original accelerator signal is directly linearly mapped to the power interval of 0-200 W, that is, 0% of the original accelerator signal corresponds to the power demand of 0W; 30% of the accelerator signal corresponds to power demand of 60 W; 60% of the original accelerator signal corresponds to the power demand of 120 W; 100% of the original accelerator signal corresponds to the power demand of 200 W.

2) The power demand of the power system is determined.

When the power demand of the power system is less than or equal to the preset cruise power threshold, the onboard control system only outputs the control signal of the ESC to change the actual accelerator value, while the second DC-DC circuit does not supply power to the ESC.

When the power demand of the power system is higher than the preset cruise power threshold, the on-board control system changes the accelerator amount of the ESC and the output voltage value of the second DC-DC circuit at the same time according to the joint adjustment strategy, so as to realize high-power power output.

In a specific embodiment, the cruising power of the unmanned aerial vehicle in the cruising state is about 30 W, so that the threshold value of the cruising power is set to 36 W, which is slightly larger than the actual required cruising power, because the accelerator control amount will fluctuate up and down around the actual value in the cruising stage.

In the power control method of the energy management system for a solar-powered unmanned aerial vehicle, the joint adjustment strategy is to query a pre-obtained power matching table, so as to output the accelerator amount of the ESC and the output voltage value of the second DC-DC correspondingly. It can also be a dynamic tracking algorithm installing corresponding force sensors on the power unit aiming at tracking the real-time highest efficiency of the power system.

The above power matching table records the operating voltage and the accelerator amount of the ESC corresponding to the optimal efficiency of the system under different power demands. The efficiency curve of the power device under the target operating condition with equal power output can be obtained through a wind tunnel test in advance, the operating voltage and accelerator amount corresponding to the highest efficiency point on the curve under this power can be recorded, and the above operations are performed on the efficiency curves under different powers to obtain the power matching table.

Figure 3:
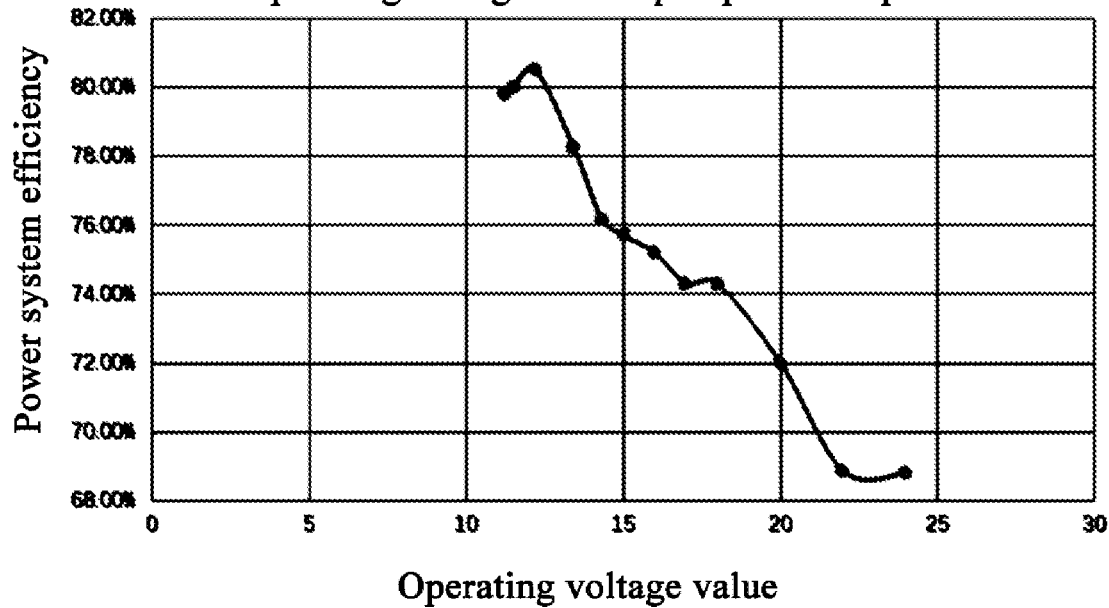
FIG. 3 is a system efficiency curve of equal power output required for establishing a power matching table according to the present disclosure.

The establishment flow of the power matching table will be described in detail hereinafter with reference to the efficiency diagram of the equal power output system of FIG. 3.

The dynamic test rack is placed in the wind tunnel, and the operating conditions of different incoming flow speeds are simulated. Under different operating conditions, the input voltage of the power system and the accelerator amount of the ESC are constantly adjusted to ensure the equal power output. In a specific embodiment, the efficiency table as shown in FIG. 3 corresponds to the operating condition that the incoming flow speed is 10 m/s. Under this operating condition, the power system always keeps equal power output of 60 W, and the efficiency diagram of the power system under different operating voltages is obtained. In FIG. 3, the operating voltage of the system changes from 10.5V to 24V. Although the output power is unchanged, it can be seen that the maximum efficiency point of the power system appears when the operating voltage is 12.2V, and the system efficiency exceeds 80%. Then, it can be recorded that under the operating condition of incoming flow of 10 m/s, when the power output of the power system is 60 W, the optimal operating voltage should be 12.2V, and the system efficiency at this time is 80.5%. By repeating similar operation, the optimal operating voltage under different operating conditions and different power output of the power system can be obtained, and then the above power matching table can be obtained. The dynamic tracking algorithm can refer to the relevant contents in CN 108791819A. In the above patent, a dynamic tension detection device suitable for an unmanned aerial vehicle and a detection method thereof are disclosed. The optimal efficiency value of the tracking system is realized by automatically changing the distance, which essentially tracks the optimal paddle efficiency value of the whole power system, that is, how much dynamic tension can be brought by the power output per watt. The same idea can be used for the establishment of the dynamic tracking algorithm of the present disclosure, because the power system constantly changes the operating voltage and the accelerator output amount and ensures the output power to be basically stable. At this time, due to the differences in the efficiency of the power system under different operating voltages, the real-time dynamic tension detected by the dynamic tension detection device will also be different. When keeping approaching the same power, the maximum value of the real-time tension can achieve the highest efficiency of the dynamic tracking system.

Figure 4:
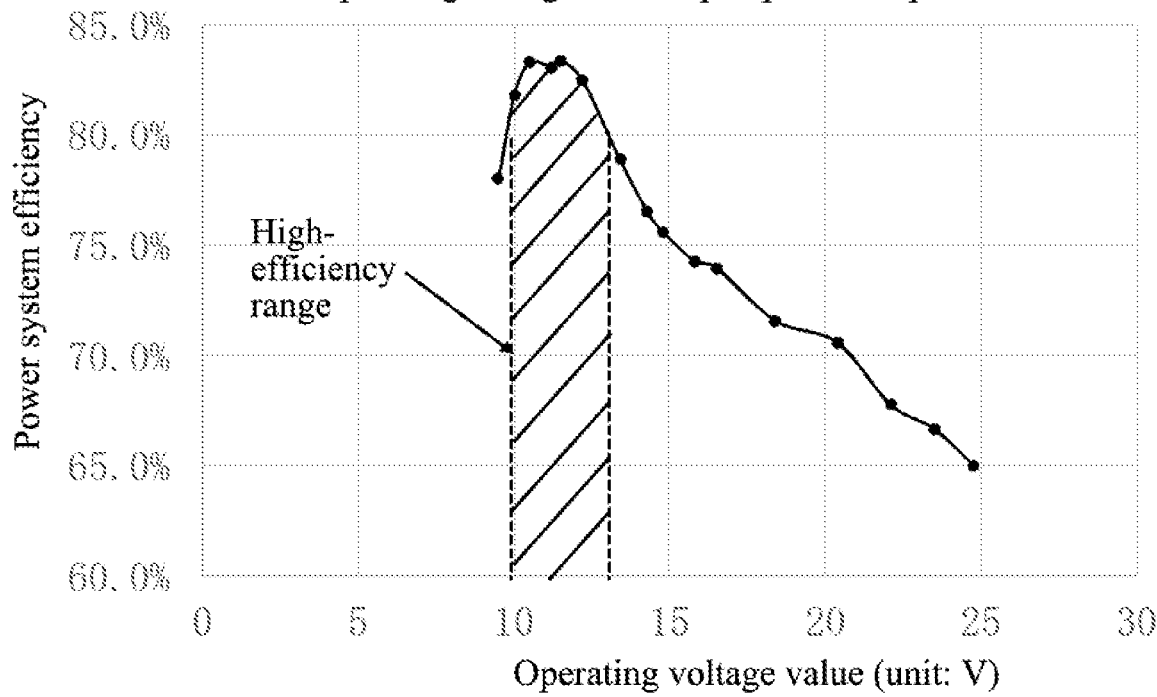
FIG. 4 is a system efficiency curve of equal power output corresponding to the cruise power of the solar-powered unmanned aerial vehicle according to the present disclosure.

In a specific embodiment, the cruise power threshold of the power system is set to 36 W, and in order to obtain the above power matching table, it is only necessary to draw a system efficiency diagram with equal power output above 36 W. Here, for further explanation, the energy management system of the present disclosure is especially suitable for a solar-powered unmanned aerial vehicle. Therefore, a system efficiency diagram with equal power output of 30 W of the power system is additionally given, which corresponds to the target power value of a certain type of solar-powered unmanned aerial vehicle in the cruising state in a specific embodiment. It can be seen from the data in FIG. 4 that the efficiency of the power system has a unique maximum when it is different from the power output of 60 W, and the system efficiency curve has a high-efficiency range of about 10V-13V at the power output of 30 W. Within this range, the efficiency of the power system is more than 80% and the efficiency value changes smoothly. In a specific embodiment, a battery pack with three series of lithium batteries is selected, and the voltage range during operation mostly coincides with the above high-efficiency range, which indicates that with the scheme design of the present disclosure, the power system is directly powered by the battery pack in the cruising state of the solar-powered unmanned aerial vehicle, so as to meet the high-efficiency power matching in the cruising stage.

The accelerator amount of the ESC controlled in the present disclosure has a value preferably in the range of 10%-95% of the full accelerator, because the response speed of transformation is lower than that of the ESC accelerator for the conventional DC-DC circuit and the ESC, so that a certain margin is left to enable the power system to realize rapid response within a certain range.

The typical efficiency values of each link of the system are analyzed. The maximum efficiency at the input side of the MPPT controller can be over 99%, while at the output side, due to the matching of parameters, the efficiency at the link of charging the battery pack through the first DC-DC circuit can be up to about 96% in operating state. Because the solar-powered unmanned aerial vehicle is in the cruising state most of the operating time, the main power supply mode is to supply power directly by the battery pack instead of the second DC-DC circuit. Since the actual operating efficiency of the second DC-DC circuit is 92%-96%, the energy loss caused by the boost of the second DC-DC circuit can be reduced in the manner of directly supplying the energy of the cruise stage by the battery pack, and the efficiency of the system can be further improved. However, in the links requiring high power output, such as large maneuvering and climbing, which account for a low proportion of the total task time, the battery pack is powered by the boost of the second DC-DC, which can meet the demand of supplying a high power. The combination of the above two power supply schemes can realize the efficient supply of cruise power and the effective supplement of high-power output at the same time.

What is claimed is:

1. An energy management system suitable for a solar-powered unmanned aerial vehicle, comprising: a photovoltaic module, a Maximum Power Point Tracking (MPPT) controller, a first direct current to direct current (DC-DC) circuit, a battery pack, a first anti-reverse circuit, an Electronic Speed Controller (ESC), a brushless direct current (BLDC) motor, a second DC-DC circuit, a second anti-reverse circuit, an onboard controller and a communication link; wherein the MPPT controller is powered by the photovoltaic module and is used to adjust an output voltage and current of the photovoltaic module to achieve an maximum power output; an output end of the MPPT controller is connected with an input end of the first DC-DC circuit, and an output end of the first DC-DC circuit is connected with the battery pack for controlling charging the battery pack;

the battery pack supplies power to the ESC via the first anti-reverse circuit, and the ESC drives the BLDC to rotate; the battery pack is also connected with an input end of the second DC-DC circuit, and then is connected to a power supply end of the ESC via the second anti-reverse circuit such that the first anti-reverse circuit is in parallel connection with the second DC-DC circuit and the second anti-reverse circuit, between the battery pack and the ESC; the second DC-DC circuit uses an adjustable boost DC-DC circuit which changes an output voltage value according to an input signal and causes the output voltage value to be higher than an input voltage value; and in an initial state of the system, the second DC-DC circuit does not operate and does not supply power to the ESC;

the communication link is used to transmit original accelerator information output by a flight control system to an on-board controller;

the on-board controller receives input and output voltage and current information from the MPPT controller and the output voltage and current information of the first DC-DC circuit for monitoring circuit state; corresponds the original accelerator information transmitted by the communication link to a power demand of a power system, and outputs two control signals at the same time according to a relationship between a current power demand of the power system and a set cruise power threshold, wherein a first control signal is used to control an accelerator amount of the ESC, and a second control signal is used to control an on-off of the second DC-DC circuit and its output voltage value during operation.

2. The energy management system for the solar-powered unmanned aerial vehicle according to claim 1, wherein the system further comprises a voltage stabilizing module, which is used to provide a stable power supply to an on-board device.

3. The energy management system for the solar-powered unmanned aerial vehicle according to claim 1, wherein the first DC-DC circuit is a BUCK-type circuit or a BUCK-BOOST-type circuit.

4. An energy management control method suitable for a solar-powered unmanned aerial vehicle, which is realized by an energy management system suitable for a solar-powered unmanned aerial vehicle, wherein the system comprises:

a photovoltaic module, a Maximum Power Point Tracking (MPPT) controller, a first direct current to direct current (DC-DC) circuit, a battery pack, a first anti-reverse circuit, an Electronic Speed Controller (ESC), a brushless direct current (BLDC) motor, a second DC-DC circuit, a second anti-reverse circuit, an onboard controller and a communication link; wherein the MPPT controller is powered by the photovoltaic module and is used to adjust an output voltage and current of the photovoltaic module to achieve a maximum power output an output end of the MPPT controller is connected with an input end of the first DC-DC circuit, and an output end of the first DC-DC circuit is connected with the battery pack for controlling charging the battery pack;

the battery pack supplies power to the ESC via the first anti-reverse circuit, and the ESC drives the BLDC to rotate; the battery pack is also connected with an input end of the second DC-DC circuit, and then is connected to a power supply end of the ESC via the second anti-reverse circuit such that the first anti-reverse circuit is in parallel connection with the second DC-DC circuit and the second anti-reverse circuit, between the battery pack and the ESC; the second DC-DC circuit uses an adjustable boost DC-DC circuit which changes an output voltage value according to an input signal and causes the output voltage value to be higher than an input voltage value; and in an initial state of the system, the second DC-DC circuit does not operate and does not supply power to the ESC;

the communication link is used to transmit original accelerator information output by a flight control system to an on-board controller;

the on-board controller receives input and output voltage and current information from the MPPT controller and the output voltage and current information of the first DC-DC circuit for monitoring circuit state; corresponds the original accelerator information transmitted by the communication link to a power demand of a power system, and outputs two control signals at the same time according to a relationship between a current power demand of the power system and a set cruise power threshold, wherein a first control signal is used to control an accelerator amount of the ESC, and a second control signal is used to control an on-off of the second DC-DC circuit and its output voltage value during operation;

the control method comprising:

1) the on-board controller receiving an original accelerator signal output by the flight control system through the communication link, and mapping the original accelerator signal with the power demand of the power system so as to obtain the power demand of the power system at this time;

2) determining the power demand of the power system:
   when the power demand of the power system is less than or equal to a preset cruise power threshold, an onboard control system outputs a control signal of the ESC to change an actual accelerator value, while the second DC-DC circuit does not operate and does not supply power to the ESC;
   when the power demand of the power system is higher than the preset cruise power threshold, the on-board control system changes the accelerator amount of the ESC and the output voltage value of the second DC-DC circuit at the same time according to a joint adjustment strategy, so as to realize high-power power output.

5. The energy management control method suitable for the solar-powered unmanned aerial vehicle according to claim 4, wherein the cruise power threshold is set according to a target power value of the unmanned aerial vehicle in a cruising state, and the value is greater than the target power value.

6. The energy management control method suitable for the solar-powered unmanned aerial vehicle according to claim 4, wherein the cruise power threshold is set according to a target power value of the unmanned aerial vehicle in a cruising state, and the value is greater than the target power value.

7. The energy management control method suitable for the solar-powered unmanned aerial vehicle according to claim 4, wherein the joint adjustment strategy is to query a pre-obtained power matching table, so as to output the accelerator amount of the ESC and the output voltage value of the second DC-DC corresponding to a required power, and the power matching table records an operating voltage and the accelerator amount of the ESC corresponding to an optimal efficiency of the system under different power demands.

8. The energy management control method suitable for the solar-powered unmanned aerial vehicle according to claim 4, wherein the joint adjustment strategy is realized by installing corresponding force sensors on a power unit and combining with a dynamic tracking algorithm aiming at tracking a real-time highest efficiency of the power system.

9. The energy management control method suitable for the solar-powered unmanned aerial vehicle according to claim 4, wherein the original accelerator signal is mapped with the power demand of the power system, and linear mapping is used.

10. The energy management control method suitable for the solar-powered unmanned aerial vehicle according to claim 4, wherein the system further comprises a voltage stabilizing module, which is used to provide a stable power supply to an on-board device.

11. The energy management control method suitable for the solar-powered unmanned aerial vehicle according to claim 10, wherein the cruise power threshold is set according to a target power value of the unmanned aerial vehicle in a cruising state, and the value is greater than the target power value.

12. The energy management control method suitable for the solar-powered unmanned aerial vehicle according to claim 10, wherein the joint adjustment strategy is to query a pre-obtained power matching table, so as to output the accelerator amount of the ESC and the output voltage value of the second DC-DC corresponding to a required power, and the power matching table records an operating voltage and the accelerator amount of the ESC corresponding to an optimal efficiency of the system under different power demands.

13. The energy management control method suitable for the solar-powered unmanned aerial vehicle according to claim 12, wherein the power matching table is obtained by a wind tunnel test, first, a efficiency curve of a power device under a target operating condition with equal power output is obtained, and then the operating voltage corresponding to a highest efficiency point on the curve and a corresponding accelerator amount are recorded one by one; different equal power outputs correspond to corresponding efficiency curves, respectively, and the operating voltage, accelerator amount and power corresponding to a highest point in each efficiency curve are recorded to obtain the power matching table.

14. The energy management control method suitable for the solar-powered unmanned aerial vehicle according to claim 4, wherein the first DC-DC circuit is a BUCK-type circuit or a BUCK-BOOST-type circuit.

15. The energy management control method suitable for the solar-powered unmanned aerial vehicle according to claim 14, wherein the cruise power threshold is set according to a target power value of the unmanned aerial vehicle in a cruising state, and the value is greater than the target power value.

16. The energy management control method suitable for the solar-powered unmanned aerial vehicle according to claim 14, wherein the joint adjustment strategy is to query a pre-obtained power matching table, so as to output the accelerator amount of the ESC and the output voltage value of the second DC-DC corresponding to a required power, and the power matching table records an operating voltage and the accelerator amount of the ESC corresponding to an optimal efficiency of the system under different power demands.

17. The energy management control method suitable for the solar-powered unmanned aerial vehicle according to claim 4, wherein the joint adjustment strategy is to query a pre-obtained power matching table, so as to output the accelerator amount of the ESC and the output voltage value of the second DC-DC corresponding to a required power, and the power matching table records an operating voltage and the accelerator amount of the ESC corresponding to an optimal efficiency of the system under different power demands.

18. The energy management control method suitable for the solar-powered unmanned aerial vehicle according to claim 17, wherein the power matching table is obtained by a wind tunnel test, first, a efficiency curve of a power device under a target operating condition with equal power output is obtained, and then the operating voltage corresponding to a highest efficiency point on the curve and a corresponding accelerator amount are recorded one by one; different equal power outputs correspond to corresponding efficiency curves, respectively, and the operating voltage, accelerator amount and power corresponding to a highest point in each efficiency curve are recorded to obtain the power matching table.

* * * * *